United States Patent [19]

Ito et al.

[11] Patent Number: 4,957,081
[45] Date of Patent: Sep. 18, 1990

[54] COMBUSTION CHAMBER OF AN ENGINE

[75] Inventors: Toshio Ito; Toshio Tanahashi, both of Susono, Japan

[73] Assignee: Toyota Jidosha Kabushiki Kaisha, Japan

[21] Appl. No.: 393,404

[22] Filed: Aug. 14, 1989

[30] Foreign Application Priority Data

Aug. 30, 1988 [JP] Japan ................................ 63-213648

[51] Int. Cl.$^5$ ............................................ F02B 31/00
[52] U.S. Cl. .................................... 123/302; 123/308; 123/193 H
[58] Field of Search ................ 123/301, 308, 432, 306, 123/193 H, 193 CG, 668, 302

[56] References Cited

U.S. PATENT DOCUMENTS

| | | | |
|---|---|---|---|
| 1,605,838 | 11/1926 | Hawley | 123/191 A |
| 1,869,077 | 7/1932 | Prentice | 123/668 |
| 2,025,020 | 12/1935 | Russell et al. | 123/668 |
| 2,292,233 | 8/1942 | Lysholm | |
| 2,456,272 | 12/1948 | Gregory | 123/193 CH |
| 2,522,921 | 9/1950 | Barkeij | |
| 2,768,617 | 10/1956 | Tierney, Jr. et al. | |
| 4,116,179 | 9/1978 | Nagumo et al. | 123/568 |
| 4,162,662 | 7/1979 | Melchior | 123/65 VD |
| 4,732,124 | 3/1988 | Nakamura et al. | 123/302 |
| 4,840,147 | 6/1989 | Tanahashi et al. | 123/193 H |
| 4,883,030 | 11/1989 | Tanahashi et al. | 123/193 CH |

FOREIGN PATENT DOCUMENTS

| | | |
|---|---|---|
| 2556720 | 6/1977 | Fed. Rep. of Germany ... 123/193 P |
| 2757648 | 6/1979 | Fed. Rep. of Germany . |
| 52-34108 | 3/1977 | Japan . |
| 50-128017 | 4/1977 | Japan . |
| 62-150015 | 4/1987 | Japan . |
| 63-201312 | 8/1988 | Japan . |
| WO89/00650 | 6/1989 | PCT Int'l Appl. . |
| 1171599 | 8/1985 | U.S.S.R. . |
| 277875 | 9/1927 | United Kingdom . |

Primary Examiner—David A. Okonsky
Attorney, Agent, or Firm—Oliff & Berridge

[57] ABSTRACT

A two-stroke engine having an intake valve and an exhaust valve which are arranged on the cylinder head. A masking wall is formed on the inner wall of the cylinder head to mask the valve opening between the valve seat and the peripheral portion of the intake valve, which is located on the exhaust valve side, for the entire time for which the intake valve is open. The valve seat and the masking wall are formed by a built-up layer which is built up on the wall of the cylinder head and machined.

21 Claims, 10 Drawing Sheets

COMBUSTION CHAMBER OF AN ENGINE

BACKGROUND OF THE INVENTION

1. Field of the Invention

The present invention relates to a combustion chamber of an engine.

2. Description of the Related Art

In a known two-stroke diesel engine, a masking wall is provided for masking a part of the valve opening between the valve seat and the intake valve and also masking a part of the valve opening between the valve seat and the exhaust valve when the valve lifts of the intake valve and the exhaust valve are small (U.S. Pat. No. 4,162,662). In this two-stroke diesel engine, fresh air is prevented from flowing into the combustion chamber from the part of the valve opening of the intake valve, masked by the masking wall, and burned gas is prevented from being discharged from the part of the valve opening of the exhaust valve, masked by the masking wall.

In a two-stroke engine disclosed in Japanese Patent Application No. 63-102659 which was assigned to the same assignee, a masking wall is provided for masking a part of the valve opening between the valve seat and the intake valve for the entire time for which the intake valve is open. In this two-stroke engine, fresh air or an air-fuel mixture is prevented from flowing into the combustion chamber from the part of the valve opening of the intake valve, masked by the masking wall for the entire time for which the intake valve is open.

In addition, in a known engine, built-up layers made of a metallic material which is different from that of the cylinder are formed on the peripheral portions of the openings of the intake port and the exhaust port. The valve seats of the intake valve and the exhaust valve are formed by machining the built-up layers (Japanese Unexamined Patent Publication No. 62-150014).

However, both the two-stroke diesel engine disclosed in the above-mentioned U.S. Pat. No. 4,162,662 and the two-stroke engine disclosed in the above-mentioned Japanese Patent Application No. 63-102659 have constructions where the valve seats of the intake valve and the exhaust valve are press-fitted into the annular grooves formed on the inner wall of the cylinder head. Nevertheless, where the valve seats are mounted on the inner wall of the cylinder head by the press-fitting, since the masking walls must be formed outwardly from, i.e., spaced from the outer periphery of the annular grooves to press-fit the valve seats of the intake valve and the exhaust valve into the annular grooves, large clearances are formed between the masking wall and the outer periphery of the intake valve and between he masking wall and the outer periphery of the exhaust valve. Consequently, even if the masking walls are arranged to mask the valve openings of the intake valve and the exhaust valve, fresh air, an air-fuel mixture, or burned gas flows through such clearances, and thus a problem occurs in that it is impossible to completely mask a part of the valve opening of the intake valve or a part of the valve opening of the exhaust valve by the masking wall.

SUMMARY OF THE INVENTION

An object of the present invention is to provide an engine capable of completely masking a part of the valve opening of the intake valve or a part of the valve opening of the exhaust valve by the masking wall.

According to the present invention, there is provided an engine including: an engine body including a cylinder head having an inner wall; a piston reciprocally movable in the engine body, the inner wall of the cylinder head and a top face of the piston defining a combustion chamber therebetween; valve means arranged on the inner wall of the cylinder head; and a masking wall formed on the inner wall of the cylinder head to mask a part of a valve opening formed between a valve seat and a peripheral portion of valve means, the valve seat and the masking wall being formed by a built-up layer which is built up on the cylinder and is machined.

The present invention may be more fully understood from the description of preferred embodiments of the invention set forth below, together with the accompanying drawings.

DESCRIPTION OF THE PREFERRED EMBODIMENTS

Figure 1:
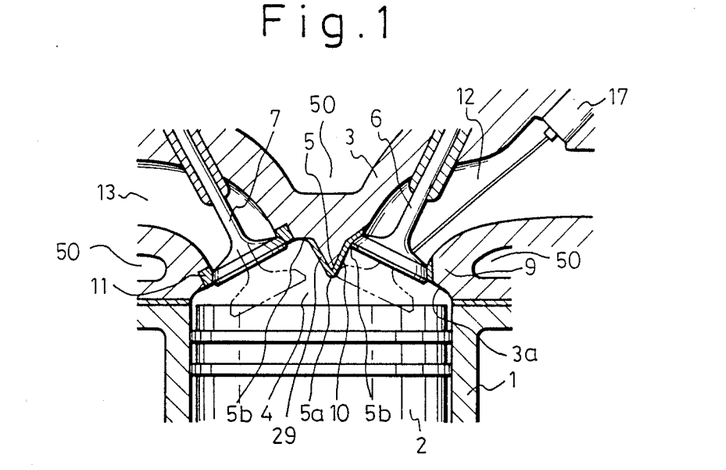
FIG. 1 is a cross-sectional side view of a two-stroke engine.
Figure 2:
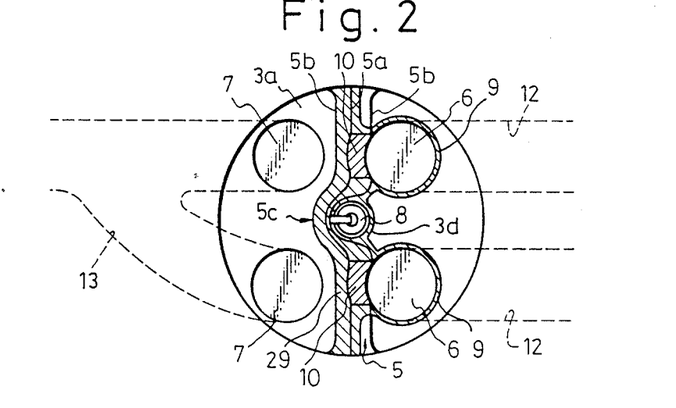
FIG. 2 is a view illustrating the inner wall of the cylinder head.
Figure 3:
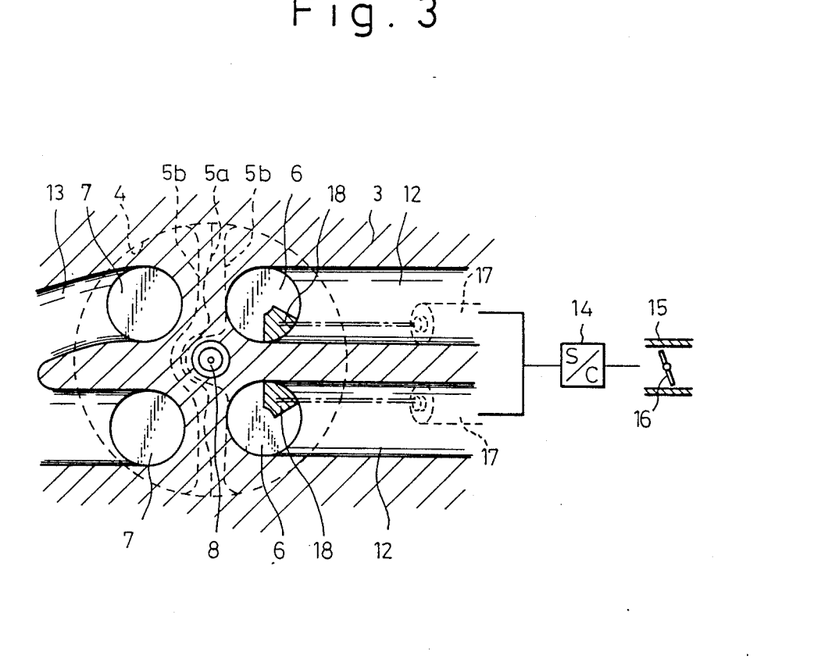
FIG. 3 is a cross-sectional plan view of the cylinder head.

Referring to FIGS. 1 through 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face of the piston 2. A raised portion 5 projecting toward the combustion chamber 4 is formed on and extends along the entire length of the diameter of the inner wall 3a of the cylinder head 3. As illustrated in FIG. 1, the raised portion 5 has a substantially triangular cross-section having a ridge 5a at the lower end thereof. The root portions of the raised portion 5 are indicated by reference numerals 5b in FIGS. 1 through 3. A pair of intake valves 6 are arranged on one side of the raised portion 5, and a pair of exhaust valves 7 are arranged on the other side of the raised portion 5.

The raised portion 5 has a central portion 5c formed as an arc facing the exhaust valves 7. A spark plug 8 is arranged on the intake valve side of the central arc portion 5c. Consequently, the spark plug 8 is located approximately on the cylinder axis on the intake valve side of the raised portion 5. Masking walls 10 are formed on the raised portion 5 for each intake valve 6 to mask the valve opening between the valve seat 9 and the peripheral portion of the intake valve 6, which is located on the exhaust valve side. These masking walls 10 are arranged as close as possible to the peripheral portions of the corresponding intake valves 6 and have an arc-shaped cross-section which extends along the peripheral portion of the corresponding intake valve 6. In addition, these masking walls 10 extend toward the combustion chamber 10 to a position lower than the intake valves 6 which are in the maximum lift position illustrated by the dashed-dotted line in FIG. 1. Consequently, the valve opening between the valve seat and the peripheral portion of the intake valve 6, which is located on the exhaust valve side, is masked by the corresponding masking wall 10 for the entire time for which the intake valve 6 is open. A fixed space exists between the peripheral portions of the exhaust valves 7 and the root portion 5b of the raised portion 5, and thus the valve opening between a valve seat 11 and the peripheral portion of the exhaust valve 7, which is located on the intake valve side, is not masked by the raised portion 5. Consequently, when the exhaust valve 7 opens, the valve opening between the valve seat 11 and the exhaust valve 7 is open to the combustion chamber 4 over the entire periphery of the exhaust valve 7.

Intake ports 12 are formed in the cylinder head 3 for the intake valves 6, and an exhaust port 13 is formed in the cylinder head 3 for the exhaust valves 7. The intake ports 12 are connected to the air cleaner (not shown) via, for example, a mechanically driven supercharger 14 driven by the engine and via an intake duct 15, and a throttle valve 16 is arranged in the intake duct 15. Fuel injectors 17 are arranged on the upper walls of the intake ports 12, and fuel having a small spread angle is injected in the form of a bar-like shape from the fuel injectors 17 toward the hatching areas 18 of the intake valves 6, as illustrated in FIG. 3. These hatching areas 18 are located on the spark plug side of the axes of the intake ports 12 and located on the opposite side of the spark plug 8 with respect to the line passing through the valve stems of both intake valves 6.

As illustrated by the hatching in FIG. 2, the valve seats 9 of the intake valves 6 and the masking walls 10 are integrally formed on the wall of the cylinder head 3 by a built-up layer which is machined. In addition, in this embodiment, almost the entire surface of the raised portion 5 and a portion 3d of the inner wall 3a of the cylinder head 3 around the spark plug 8 are also integrally formed on the wall of the cylinder head 3 by the built-up layer together with the valve seats 9 and the masking walls 10.

Next, a method of forming the built-up layer will be described with reference to FIG. 4.

Figure 4A:
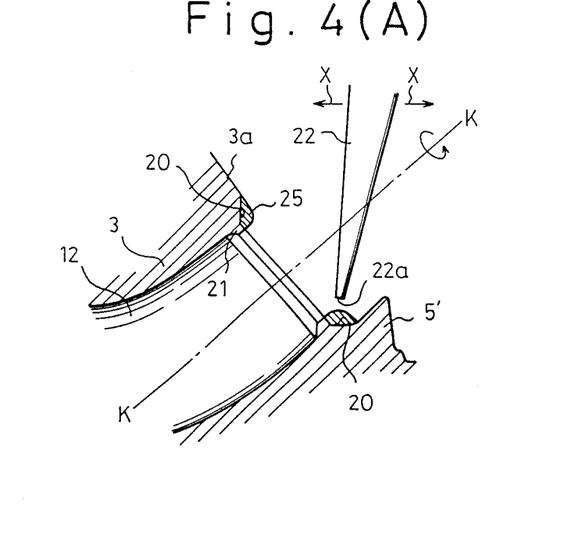
FIGS. 4(A), 4(B), 4(C), 4(D), 4(E) and 4(F) are views for illustrating a method of forming the built-up layer for the valve seat and the masking wall.
Figure 4B:
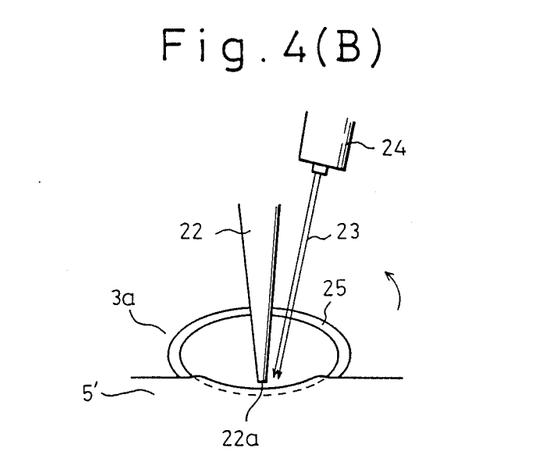

FIGS. 4(a) and (b) illustrate a method of forming the built-up layer on the wall of the cylinder head 3, which is cast from an aluminum alloy. In FIG. 4(A), reference numeral 5' indicates a base portion for forming the raised portion 5 thereon, and reference numeral 20 indicates a valve seat-forming surface for forming the valve seat of the intake valve 6 thereon. An inwardly projecting annular rib 21 is formed on the inner wall of the outlet opening of the intake port 12 between the valve seat-forming surface 20 and the intake port 12. The cylinder head 3 is rotated about the axis K—K of the intake valve 6, and the inclined angle of this axis K—K is determined so that the valve seat-forming surface 20 located at the lowermost position becomes horizontal. A metal powder is fed from the tip end 22a of a hopper 22 onto the valve seat-forming surface 20 which is rotating about the axis K—K, and a high energy 23 is applied to the metal powder on the valve seat-forming surface 20 from a high energy source 24. The metal powder is a powder of aluminum alloy forming the cylinder head 3, or a copper-based powder (for example, 15 wt. % of nickel, 3 wt. % of iron, 1 wt. % of phosphorus, and the balance of copper). The high energy is, for example, a laser beam. In this case, the high energy source 24 is, for example, a $CO_2$ laser.

When the high energy 23 is applied to the metal powder on the valve seat-forming surface 20, the metal powder is melted. The metal powder solidifies to form the built-up layer 25. The metal powder is continuously fed onto the valve seat-forming hopper 22, which is reciprocally moved in the direction shown by the arrows X in FIG. 4(a). Then, the high energy 23 is successively applied to the metal powder, and the metal powder is successively melted and solidified. Consequently, the built-up layer 25 is formed over the entirety of the valve seat-forming surface 20 and integrally connected to the cylinder head 3.

Figure 4C:
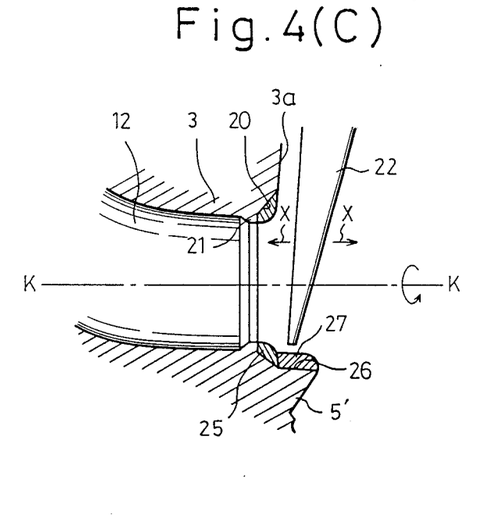

Then, as illustrated in FIG. 4(c), the cylinder head 3 is rotated about the axis K—K in such a way that the masking wall-forming surface 26 located at the lowermost position becomes horizontal, and the built-up layer 27 is formed on the masking wall-forming surface 26. This built-up layer 27 is integrally connected to the cylinder head 3 and the built-up layer 25.

Figure 4D:
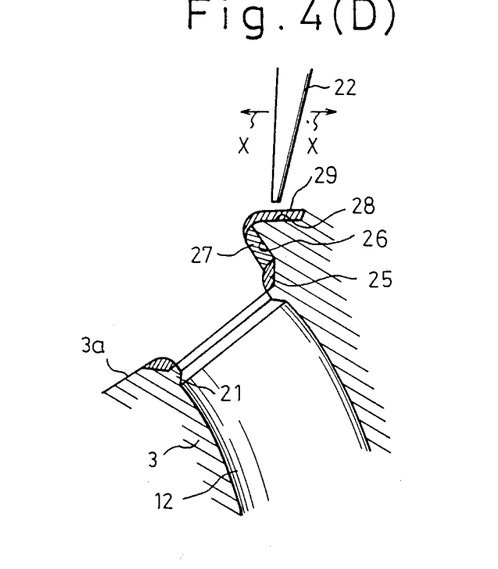

Then, as illustrated in FIG. 4(D), the cylinder head 3 is moved in the longitudinal direction of the side wall 28 of the base portion 5,, which side wall is located opposite to the masking wall-forming surface 26, in such a way that the side wall 28 of the base portion 5' becomes horizontal, and thereby the built-up layer 29 is formed on the side wall 28 of the base portion 5'. Then, the remaining built-up layer is formed in the same manner as the built-up layer 29.

Figure 4E:
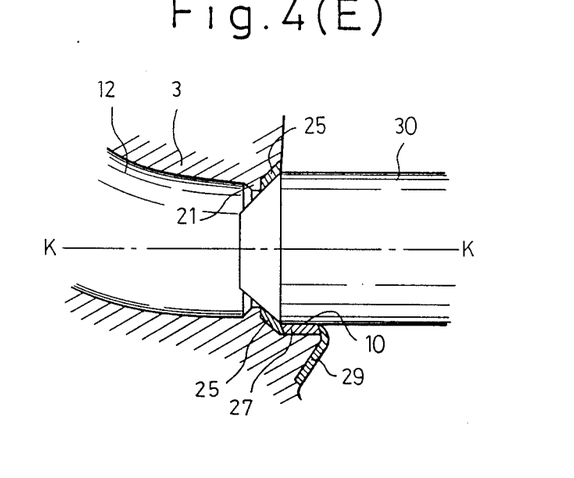

Then, as illustrated in FIG. 4(E), the built-up layers 25 and 27 are cut by a cutter 30 having a conically shaped head portion and rotating about the axis K—K, whereby the masking wall 10 is formed.

Figure 4F:
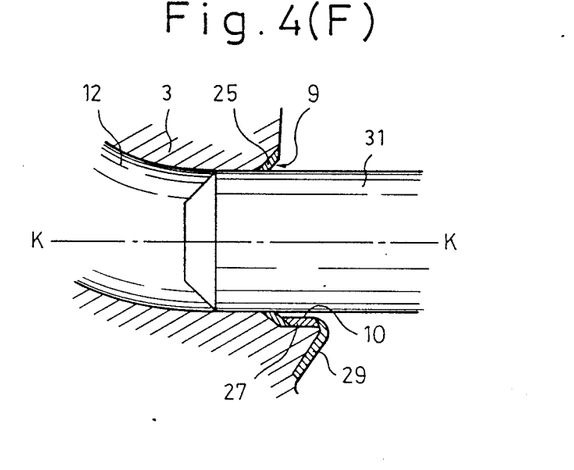

Then, as illustrated in FIG. 4(F), the built-up layer 25 and the annular rib 21 are cut by an other cutter 31 having a conically shaped head portion and rotating about the axis K—K, whereby the valve seat 9 smoothly connected to the wall of the intake port 12 is formed.

By forming the valve seat 9 for the intake valve 6 by cutting the built-up layer 25, the axis of the valve seat 6 for the intake valve 6 completely coincides with the axis K—K of the intake valve 6. In addition, the cylindrical portion of the cutter 30 has a diameter which is substantially the same as that of the outer periphery of the valve head of the intake valve 6, and thus, by forming the masking wall 10 by cutting the built-up layer 27 by means of the cutter 30, it is possible to substantially eliminate any air gap between the masking wall 10 and the outer periphery of the valve head of the intake valve 6. Consequently, when the intake valve 6 opens, the valve opening formed between the valve seat 9 and the peripheral portion of the intake valve 6, which is located on the exhaust valve side, is completely masked by the masking wall 10, and thus the inflow of fresh air from the valve opening of the intake valve 6, which is located on the exhaust valve side, is completely prevented by the masking wall 10.

Figure 5:
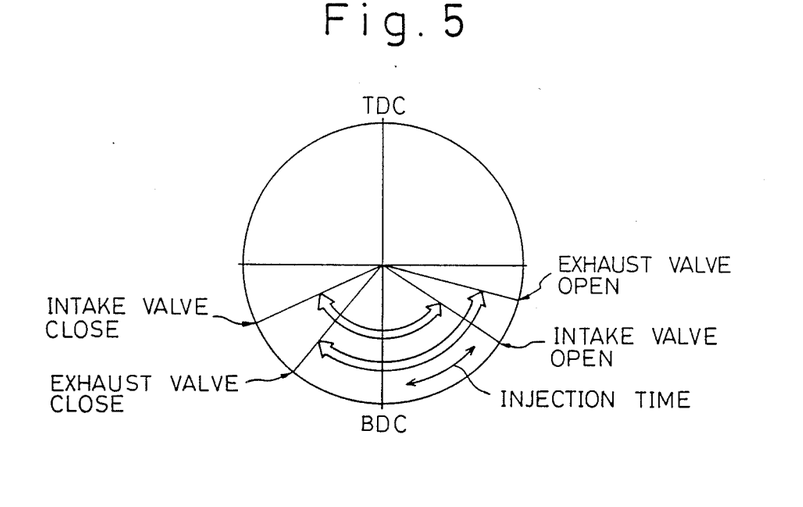
FIG. 5 is a diagram illustrating the opening time of the intake valve and the exhaust valve.

FIG. 5 illustrates an example of the opening time of the intake valves 6 and the exhaust valves 7 and an example of the injection time. In the example illustrated in FIG. 5, the exhaust valves 7 open earlier than the intake valves 6, and the exhaust valves 7 close earlier than the intake valves 6. In addition, the fuel injection time is set to occur at a time after the intake valves 6 open and before the piston 2 reaches bottom dead center BDC.

Figure 6:
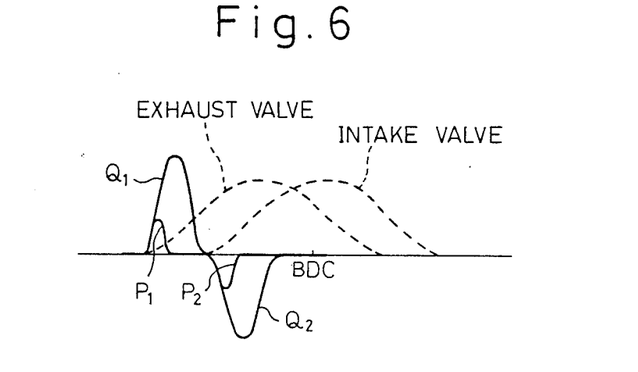
FIG. 6 is a diagram illustrating the valve lift of the intake valve and the exhaust valve and illustrating a change in the exhaust port.

FIG. 6 illustrates the valve lifts of the intake valves 6 and the exhaust valves 7 and illustrates changes in pressures $P_1$, $P_2$, $Q_1$, $Q_2$ in the exhaust port 13. The changes in pressures $P_1$, $P_2$, $Q_1$, $Q_2$ will be hereinafter described.

Figure 7A:
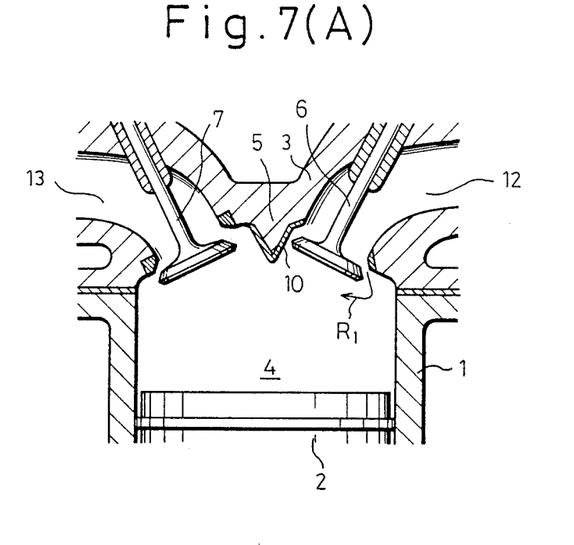
FIGS. 7(A) and 7(B) are cross-sectional side views of the engine, illustrating the operation of the engine when under a light load.
Figure 7B:
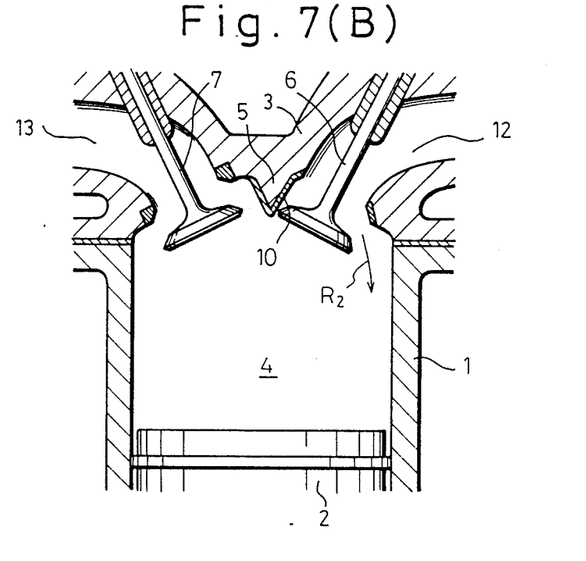
Figure 8A:
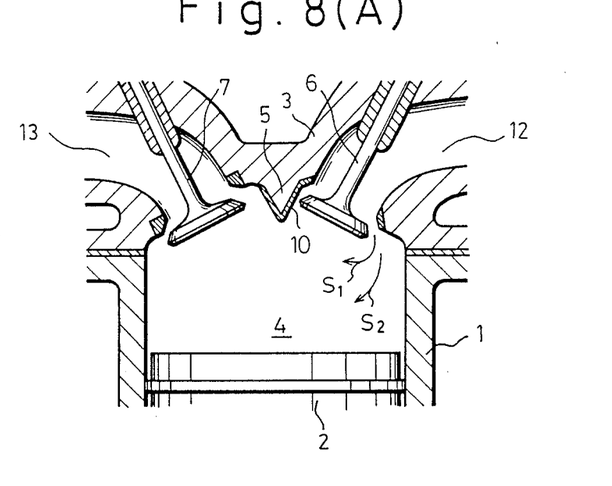
FIGS. 8(A) and 8(B) are cross-sectional side views of the engine, illustrating the operation of the engine when under a heavy load.
Figure 8B:
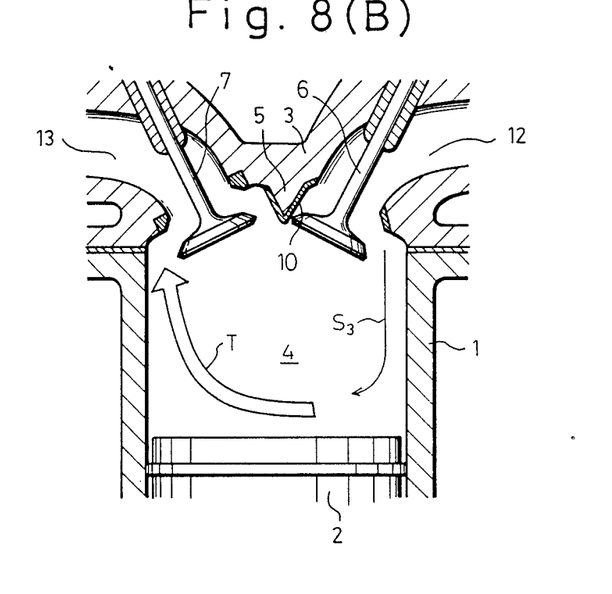

Next, the scavenging operation and the stratifying operation will be described with reference to FIGS. 7 and 8. FIG. 7 illustrates a state where the engine is operating under a light load, and FIG. 8 illustrates a case where the engine is operating under a heavy load. In addition, FIGS. 7(A) and 8(A) illustrate a moment immediately after the intake valves 6 open, and FIGS. 7(B) and 8(B) illustrate a moment when the piston 2 is approximately at bottom dead center BDC.

The scavenging operation and the stratifying operation under a light load operation of the engine will be first described, with reference to FIG. 7.

When the piston 2 moves downward, and the exhaust valves 7 open, burned gas under a high pressure in the combustion chamber 4 flows out into the exhaust port 13, and thus the pressure in the exhaust port 13 becomes temporarily positive, as illustrated by $P_1$ in FIG. 6. This positive pressure $P_1$ propagates in the exhaust passage in the downstream direction thereof and is reflected at the joining portion of the exhaust passages for each cylinder. Subsequently, the thus reflected pressure is again propagated toward the exhaust port 13 in the form of a vacuum pressure. Consequently, when the intake valves 6 open, the vacuum pressure is produced in the exhaust port 13, as illustrated by $P_2$ in FIG. 6. The timing at which the vacuum pressure $P_2$ is produced depends on the length of the exhaust passage. When the engine is operating under a light load, the combustion pressure is low, and thus the positive pressure $P_1$ and the vacuum pressure $P_2$ produced in the exhaust port 13 are relatively small.

When the intake valves 6 open, fresh air containing fuel therein is fed into the combustion chamber 4 from the intake ports 12. At this time, since the valve openings of the intake valves 6, located on the exhaust valve side are completely masked by the masking walls 10 as mentioned above, the fresh air containing fuel therein flows into the combustion chamber 4 from the openings of the intake valves 6, which are located opposite to the exhaust valves 7. In addition, when the intake valves 6 open, since the vacuum pressure is produced in the exhaust port 13, as illustrated by $P_2$ in FIG. 6, the burned gas positioned at the upper portion of the combustion chamber 4 is sucked out into the exhaust port 13 due to this vacuum pressure. At this time, as illustrated by the arrow R in FIG. 7(A), the fresh air and the fuel is pulled toward the exhaust valves 7 due to the movement of the burned gas, and thus the fuel is introduced into a space around the spark plug 8 (FIG. 2). Then, when the piston 2 moves further downward, as illustrated in FIG. 7(B), the fresh air containing the fuel therein flows downward along the inner wall of the cylinder beneath the intake valves 6, as illustrated by the arrow $R_2$ in FIG. 7(B). But, when the engine is operating under a light load, the amount of fresh air fed into the combustion chamber 4 is small, and in addition, the velocity of the fresh air flowing into the combustion chamber 4 is low. As a result, the fresh air does not reach the top face of the piston 2 but stays at the upper portion of the combustion chamber 4, and consequently, when the piston 2 moves upward, since the air-fuel mixture has collected at the upper portion of the combustion chamber 4, and the residual unburned gas has collected at the lower portion of the combustion chamber 4, the interior of the combustion chamber 4 is stratified, and thus the air-fuel mixture is properly ignited by the spark plug 8.

When the engine is operating under a heavy load, since the combustion pressure becomes high, the positive pressure produced in the exhaust port 13 also becomes high, as illustrated by $Q_1$ in FIG. 6, and in addition, the vacuum pressure produced by the reflection of the positive pressure $Q_1$ becomes great, as illustrated by $Q_2$ in FIG. 6. Furthermore, the peak of the vacuum pressure $Q_2$ occurs a short interval after production of the positive pressure $P_2$.

When the engine is operating under a heavy load, the amount of fresh air fed into the combustion chamber 4 is large, and the velocity of the fresh air flowing into the combustion chamber 4 becomes high. Consequently, when the intake valves 6 open, a large amount of the fresh air containing the fuel therein flows into the combustion chamber 4 at a high speed. Subsequently, when the burned gas positioned at the upper portion of the combustion chamber 4 is sucked into the exhaust port 13, due to the production of the vacuum pressure $Q_2$ in the exhaust port 13, the direction of flow of the fresh air is changed toward the central portion of the combustion chamber 4 as illustrated by the arrows $S_1$ and $S_2$ in FIG. 8(A). Then, when the piston 2 moves further downward, the fresh air flows downward along the inner wall of the cylinder beneath the intake valves 6 and reaches the top face of the piston 2, as illustrated by $S_3$ in FIG. 8(B). Consequently, the burned gas in the combustion chamber 4 is gradually pushed out by the fresh air and discharged into the exhaust port 13, as illustrated by the arrow T in FIG. 8(B), and thus a loop scavenging operation is realized in the combustion chamber 4.

In a two-stroke engine equipped with the above intake valve and exhaust valve arrangement, the most efficient scavenging effect can be obtained by carrying out such a loop scavenging operation. In addition, in such a two-stroke engine, the amount of residual burned gas is large, and to obtain a good ignition and a subsequent good combustion even if the amount of residual burned gas is large, the air-fuel mixture must be collected around the spark plug, i.e., a good stratification must be obtained. In the embodiment illustrated in FIGS. 1 through 3, the provision of the masking walls 10 makes it possible to completely prevent a flow of fresh air and fuel along the inner wall 3a of the cylinder head 3 which then flows out into the exhaust port 13, and as a result, a good scavenging operation and a good stratification can be obtained.

In addition, by arranging the spark plug 8 on the intake valve side of the raised portion 5, the air-fuel mixture tends to collect around the spark plug 8, and thus it is possible to obtain a proper ignition of the air-fuel mixture by the spark plug 8. Particularly, the air-fuel mixture tends to stay within an area surrounded by the central arc portion 5c of the raised portion 5, and since the spark plug 8 is arranged in this area, the ignition is thus improved. In addition, since the fuel injected from the fuel injectors 17 is instantaneously fed into the combustion chamber 4 after the fuel impinges upon the rear faces of the valve bodies of the intake valves 6, and is atomized, the fuel will not adhere to the inner walls of the intake ports 12.

Figure 9:
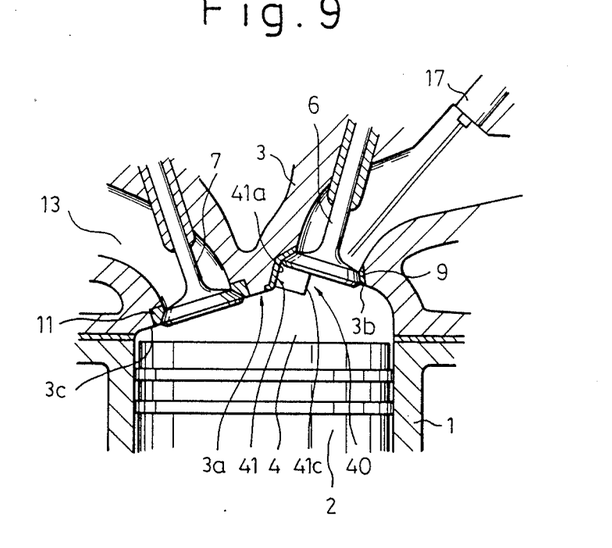
FIG. 9 is a cross-sectional side view of another embodiment of a two-stroke engine.
Figure 10:
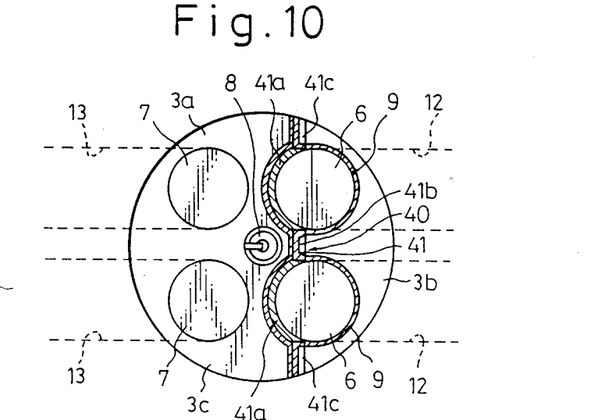
FIG. 10 is a view illustrating the inner wall of the cylinder head of FIG. 9.

FIGS. 9 and 10 illustrate another embodiment of a two-stroke engine, by which an even better loop scavenging operation is obtained. In this embodiment, a depression 40 is formed on the inner wall 3a of the cylinder head 3, and the intake valves 6 are arranged on the inner wall portion 3b of the cylinder head 3, which forms the bottom wall of the depression 40. The inner wall portion 3c of the cylinder head 3 other than the depression 40 is substantially flat, and the exhaust valves 7 are arranged on this inner wall portion 3c of the cylinder head 3. The inner wall portions 3b and 3c of the cylinder head 3 are interconnected via the peripheral wall 41 of the depression 40. The peripheral wall 41 of the depression 40 comprises masking walls 41a arranged as close as possible to the peripheral portions of the corresponding intake valves 6 and extending archwise along the periphery of the corresponding intake valves 6, a fresh air guide wall 41b arranged between the intake valves 6, and fresh air guide walls 41c each arranged between the circumferential wall of the inner wall 3a of the cylinder head 3 and the corresponding intake valve 6. The masking walls 41a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 41a for the entire time for which the intake valve 6 is open. The fresh air guide wall 41b and the fresh air guide walls 41c are located on substantially the same plane and extend substantially in parallel to the line passing through the centers of the intake valves 6. The spark plug 8 is arranged on the inner wall portion 3c of the cylinder head 3 in such a manner that it is located at the center of the inner wall 3a of the cylinder head 3.

Figure 11:
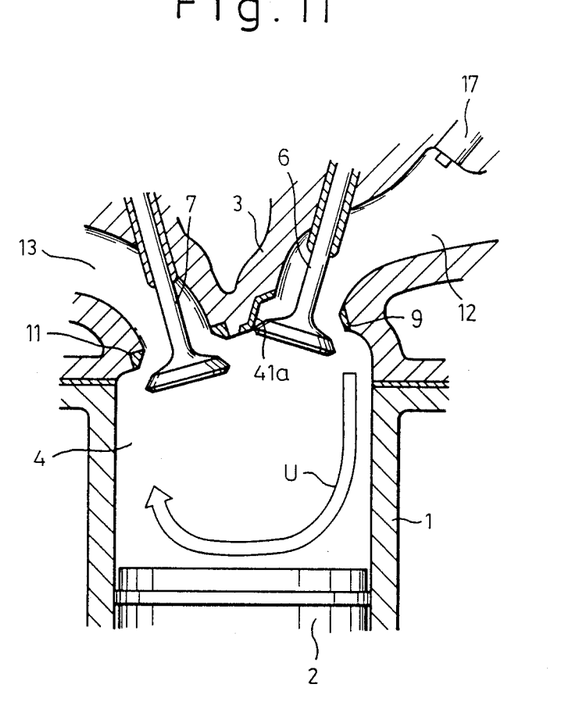
FIG. 11 is a cross-sectional side view of the engine illustrating the operation of the engine of FIGS. 9 and 10.

In this embodiment, the arced masking walls 41a have a peripheral length longer than that of the masking wall 10 illustrated in FIGS. 1 through 3, and thus, at the valve opening between the intake valve 6 and the valve seat 9, one-third of the valve opening, which is located on the exhaust valve side, is masked by the corresponding masking wall 41a, and the fresh air is fed from the unmasked two-thirds of the valve opening, which is located at the opposite side of the exhaust valve 7. In addition, in this embodiment, the fresh air flowing into the combustion chamber 4 from the intake valve 6 is guided by the fresh air guide walls 41b, 41c so as to flow downward along the inner wall of the cylinder. Consequently, in this embodiment, when the intake valves 6 open, a large part of the fresh air flows toward the top face of the piston 2 along the inner wall of the cylinder, as illustrated by the arrow U in FIG. 11, and thus a good loop scavenging operation is carried out.

As illustrated by the hatching in FIG. 10, also in this embodiment, the masking walls 41a and the valve seats 9 for the intake valves 6 are formed by the built-up layer formed on the wall of the cylinder head 3 and machined. In addition, in this embodiment, a portion of the inner wall portion 3c, which extends along the peripheral wall 41 of the depression 40, and a large part of the fresh air guide walls 41b, 41c, are formed by the built-up layer together with the masking walls 41a and the valve seats 9. Consequently, also in this embodiment, the valve opening formed between the valve seat 9 and the peripheral portion of the intake valve 6, which is located on the exhaust valve side, is completely masked by the masking wall 41a.

Where the built-up layers 25, 27, and 29 (FIG. 4) is made of a copper-based metal powder, the heat transfer coefficient of the built-up layers 25, 27, and 29 becomes excessively high. Consequently, in this case, in FIGS. 1 and 2, the heat of the valve seats 9 as well as the heat of the surface of the raised portion 5 can easily escape into the cooling water passage 50 through the cylinder head 3. Therefore, it is possible to prevent the surface of the raised portion 5, particularly the ridge 5a of the raised portion 5, from being excessively heated. In addition, by forming the built-up layer around the spark plug 8 as illustrated in FIG. 2, it is possible to prevent the spark plug 8 from being excessively heated. In addition, in the embodiment illustrated in FIGS. 9 and 10, it is possible to prevent the connecting portion of the inner wall portion 3c and the peripheral wall 41 of the depression, that is, the edge portion, from being excessively heated.

The embodiments hereinbefore described indicate the case where the present invention is applied to the valve seats 9 and the masking walls 10, 41a for the intake valves 6. However, where a masking wall is provided for the exhaust valve 7, the present invention may be applied to the valve seat and the masking wall for the exhaust valve. In addition, the present invention may be also applied to a two-stroke diesel engine, a four-stroke gasoline engine, and a four-stroke diesel engine.

According to the present invention, it is possible to completely mask a part of the valve opening of the intake valve and a part of the valve opening of the exhaust valve by the masking wall.

While the invention has been described by reference to specific embodiments chosen for purposes of illustration, it should be apparent that numerous modifications could be made thereto by those skilled in the art without departing from the basic concept and scope of the invention.

We claim:

1. An engine comprising:
   an engine body including a cylinder head having an inner wall;
   a piston reciprocally movable in said engine body, the inner wall of said cylinder head and a top face of said piston defining a combustion chamber therebetween;
   valve means arranged on the inner wall of said cylinder head; and
   a masking wall formed on the inner wall of said cylinder head to mask a part of a valve opening formed between a valve seat and a peripheral portion of said valve means, said valve seat and said masking wall being formed by a built-up layer which is built up on said cylinder and is machined, said built-up layer comprising a copper-based metallic material containing nickel, iron, and phosphorus, said metallic material being different from that of said cylinder head.

2. An engine according to claim 1, wherein said built-up layer forming said valve seat and said built-up layer forming said masking wall are integrally formed and connected to each other.

3. An engine according to claim 1, wherein said valve means comprises two intake valves and said masking wall is provided for each intake valve.

4. An engine according to claim 1, further comprising a spark plug arranged on the inner wall of said cylinder head, and said built-up layer is formed on the inner wall of said cylinder head around said spark plug.

5. An engine according to claim 1, wherein said valve means comprises at least one intake valve and at least one exhaust valve, and said masking wall is arranged between said intake valve and said exhaust valve to mask a valve opening formed between said valve seat and the peripheral portion of said intake valve, which is located on said exhaust valve side, for the entire time for which said intake valve is open.

6. An engine according to claim 5, wherein said masking wall is arranged close to the peripheral portion of said intake valve, which is located on said exhaust valve side, and extends downward toward said piston to a position lower than said intake valve when said intake valve is in the maximum lift position thereof.

7. An engine according to claim 6, wherein said masking wall extends in an arc along the peripheral portion of said intake valve.

8. An engine according to claim 7, wherein said masking wall extends along approximately one-third of the peripheral portion of said intake valve.

9. An engine according to claim 5, wherein the inner wall of said cylinder head has a raised portion projecting downward therefrom toward said piston and extending between said intake valve and said exhaust valve along the inner wall of said cylinder head, and said masking wall is formed on said raised portion.

10. An engine according to claim 9, wherein said built-up layer is formed on a large part of said raised portion.

11. An engine according to claim 9, wherein said exhaust valve is spaced from said raised portion.

12. An engine according to claim 5, wherein said inner wall of said cylinder head has a depression formed thereon and comprises a substantially flat inner wall portion other than said depression, a bottom wall of said depression, and a circumferential wall of said depression, which is located between said inner wall portion and said bottom wall, said intake valve being arranged on said bottom wall, said exhaust valve being arranged on said inner wall portion, said masking wall being formed on said circumferential wall.

13. An engine according to claim 12, wherein said built-up layer is formed on a large part of said circumferential wall.

14. An engine according to claim 12, wherein said built-up layer is formed on both said circumferential wall and said inner wall portion and extends along a connecting portion of said circumferential wall and said inner wall portion.

15. An engine according to claim 12, wherein the circumferential wall of said depression extends between opposed ends of a circumferential wall of the inner wall of said cylinder head, and a portion of said circumferential wall of said depression other than said masking wall forms a fresh air guide wall extending downward toward said piston.

16. An engine according to claim 15, wherein said valve means comprises two intake valves and said fresh air guide wall comprises a first guide wall located between said intake valves and second guide walls located between the circumferential wall of the inner wall of said cylinder head and said intake valves.

17. An engine according to claim 16, wherein said first guide wall and said second guide walls are located in substantially same plane which extends substantially in parallel to a line passing through said intake valves.

18. An engine according to claim 5, wherein said exhaust valve opens earlier than said intake valve and closes earlier than said intake valve.

19. An engine according to claim 5, wherein said cylinder head has an intake port formed therein and a fuel injector arranged in said intake 20. An engine according to claim 19, wherein fuel is injected from said fuel injector toward a portion of a rear face of a valve body of said intake valve, which portion is located on the opposite side of said masking wall.

21. An engine according to claim 20, wherein said fuel has a bar-like shape having a small spread angle.

* * * * *